(12) United States Patent
Burnheimer (10) Patent No.: US 11,489,603 B2
(45) Date of Patent: Nov. 1, 2022

(54) MEDIA ESSENCE LIBRARY

(71) Applicant: NBCUNIVERSAL MEDIA, LLC, Universal City, CA (US)

(72) Inventor: Andrew Burnheimer, Brooklyn, NY (US)

(73) Assignee: NBCUNIVERSAL MEDIA, LLC, Universal City, CA (US)

( * ) Notice: Subject to any disclaimer, the term of this patent is extended or adjusted under 35 U.S.C. 154(b) by 0 days.

(21) Appl. No.: 16/579,702

(22) Filed: Sep. 23, 2019

(65) Prior Publication Data

US 2021/0091868 A1   Mar. 25, 2021

(51) Int. Cl.
*H04H 60/73*   (2008.01)
*G06F 16/45*   (2019.01)
*G06F 16/953*  (2019.01)
*H04H 60/66*   (2008.01)

(52) U.S. Cl.
CPC ............. *H04H 60/73* (2013.01); *G06F 16/45* (2019.01); *G06F 16/953* (2019.01); *H04H 60/66* (2013.01)

(58) Field of Classification Search
CPC ...... H04H 60/703; H04H 60/66; H04H 20/00; H04H 40/00; H04H 60/00; H04H 60/73; H04H 60/68; H04H 60/61; H04H 60/56; H04H 60/29; H04H 60/35; G06F 16/953; G06F 16/45; G06F 16/40; G06F 16/93
See application file for complete search history.

(56) References Cited

U.S. PATENT DOCUMENTS

| | | | |
|---|---|---|---|
| 6,314,398 B1* | 11/2001 | Junqua ................ | G10L 15/1822 348/E5.105 |
| 6,700,624 B2* | 3/2004 | Yun ...................... | H04N 5/4401 348/553 |
| 7,500,257 B2* | 3/2009 | Berstis .................. | H04H 20/14 725/10 |
| 10,587,907 B2* | 3/2020 | Corl ..................... | H04N 21/2407 |
| 2003/0078000 A1* | 4/2003 | Tatsumi ............... | H04N 21/454 455/3.06 |
| 2008/0231750 A1* | 9/2008 | Suzuki .................. | H04H 60/25 348/563 |
| 2008/0266453 A1* | 10/2008 | Fisher ................. | H04N 21/6112 348/E9.029 |
| 2010/0037263 A1* | 2/2010 | Riley ............... | H04N 21/47208 725/50 |
| 2010/0118197 A1* | 5/2010 | Kim ................... | H04N 21/4345 348/570 |
| 2010/0223357 A1* | 9/2010 | Einarsson ........... | H04L 65/4084 709/219 |

(Continued)

*Primary Examiner* — Thomas J Dailey
(74) *Attorney, Agent, or Firm* — Lee, Hong, Degerman, Kang & Waimey PC (57) ABSTRACT

According to at least one embodiment, a method of processing data in a broadcast engineering environment includes: receiving a user request comprising a first identifier that identifies a discrete broadcast signal and identifying a set of identifiers associated with the first identifier. The set of identifiers includes at least one of Connection, Domain, Domain Type, Equipment, Essence, Feed, Format, Instance, Mnemonic Base, Pattern, Signal Mnemonic, or Site. The method further includes generating association information based on the identified set of identifiers, and transmitting the generated association information based on the received user request.

17 Claims, 7 Drawing Sheets

(56) References Cited

U.S. PATENT DOCUMENTS

| | | | |
|---|---|---|---|
| 2012/0096502 A1* | 4/2012 | Yae | H04N 21/6125 |
| | | | 725/108 |
| 2012/0110202 A1* | 5/2012 | Niman | H04N 21/64322 |
| | | | 709/231 |
| 2014/0150014 A1* | 5/2014 | Aitken | H04H 20/423 |
| | | | 725/109 |

* cited by examiner

Edit Feed Object  × tag
[Select... ▾]

parentFeed
[E! ×  ▾]

subFeed
[East/Main ×  ▾]

[Cancel] [Submit]

302 → tag
304 → parentFeed

FIG. 3A

Edit Pattern Object  × name
[Main Uplink Channel]

mnemBase
[CLN ×|SRV ×|CHAN ×|PGM ×|PREMUX ×  ▾]

[Cancel] [Submit]

306 → name
308 → mnemBase

FIG. 3B

Create Instance Object  × name — 310
[272X]

tag
[Select... ▾]

signalMnemonic
[Select... ▾]

site
[NY ×  ▾]

feed — 312
[E! East/Main ×  ▾]

pattern — 314
[Main Uplink Channel ×  ▾]

Suggested Signal Mnemonics: — 316
- CLN 272X
- SRV 272X
- CHAN 272X
- PGM 272X
- PREMUX 272X

[Generate]

[Cancel] [Submit]

FIG. 3C

Edit SignalMnemonic Object name: PGM 272X
workOrderNumber:
tag: Select...
instance: 272X
connection: Unknown
essence: Select...

Cancel  Submit

FIG. 3D

Edit Essence Object specifier — 318: udp://@239.116.0.13:9001
pid:
tag: Select...
signalMnemonic: PGM 272 x
domain: Corporate Network
format: NBCS_TS-15
elementType: TS Cancel  Submit

FIG. 6

MEDIA ESSENCE LIBRARY

BACKGROUND

Broadcast engineering may involve processing media-related signals. Such signals may include video signals, audio signals and ancillary data signals. As each of the different signals travels through different components and subsystems of a broadcast system, information regarding video, audio, and ancillary data signals may be maintained within broadcast engineering organizations. For example, such signals may be maintained so that media signals can be classified and tracked in a more cohesive manner enabling users to identify broadcast feeds or derivatives of broadcast feeds as portions of the feed propagate through the system. Because different teams and organizations may categorize information differently, a need exists to be able to efficiently and consistently identify, classify, store, maintain, and look up details about the media signals in disparate locations.

SUMMARY

Aspects of the present disclosure are directed to utilizing a data model that serves as a catalog for information including broadcasting-related metadata for uncompressed and compressed signals, including video signals, audio signals and ancillary data signals, and the facilities that convey the signals. Utilizing the data model, the information may be organized in a cohesive and/or useful manner. For example, broadcasting-related metadata may be saved and maintained at a single location, and subsequently retrieved by one or more relevant systems from that location.

According to at least one embodiment, a method of processing data in a broadcast engineering environment includes: receiving a user request comprising a first identifier that identifies a discrete broadcast signal and identifying a set of identifiers associated with the first identifier. The set of identifiers includes at least one of Connection, Domain, Domain Type, Equipment, Essence, Feed, Format, Instance, Mnemonic Base, Pattern, Signal Mnemonic, or Site. The method further includes generating association information based on the identified set of identifiers, and transmitting the generated association information based on the received user request.

According to at least one embodiment, an apparatus for processing data in a broadcast engineering environment includes: a network communication unit configured to transmit and receive data; and one or more controllers. The one or more controllers are configured to: receive a user request comprising a first identifier that identifies a discrete broadcast signal; and identify a set of identifiers associated with the first identifier. The set of identifiers includes at least one of Connection, Domain, Domain Type, Equipment, Essence, Feed, Format, Instance, Mnemonic Base, Pattern, Signal Mnemonic, or Site. The one or more controllers are further configured to: generate association information based on the identified set of identifiers; and transmit the generated association information based on the received user request.

According to at least one embodiment, a machine-readable non-transitory medium has stored thereon machine-executable instructions for processing data in a broadcast engineering environment. The instructions include: receiving a user request comprising a first identifier that identifies a discrete broadcast signal; and identifying a set of identifiers associated with the first identifier. The set of identifiers include at least one of Connection, Domain, Domain Type, Equipment, Essence, Feed, Format, Instance, Mnemonic Base, Pattern, Signal Mnemonic, or Site. The instructions further include: generating association information based on the identified set of identifiers; and transmitting the generated association information based on the received user request.

BRIEF DESCRIPTION OF THE DRAWINGS

The above and other aspects and features of the present disclosure will become more apparent upon consideration of the following description of embodiments, taken in conjunction with the accompanying drawing figures.

DETAILED DESCRIPTION

In the following detailed description, reference is made to the accompanying drawing figures which form a part hereof, and which show by way of illustration specific embodiments of the present invention. It is to be understood by those of ordinary skill in the technological field of content management and delivery that other embodiments may be utilized, and that structural, electrical, as well as procedural changes may be made without departing from the scope of the present invention. Wherever possible, the same reference numbers will be used throughout the drawings to refer to the same or similar parts.

Embodiments of the present invention relate to a system and method for processing data in a broadcast engineering environment. In this disclosure, the content will be discussed primarily with respect to content generated for distribution via broadcast protocols. The term "distribution" will be used broadly to include various delivery methods of content, including air, cable, satellite, Internet, wireless, and other platforms known in the art, and shall not be limited to a particular technology or platform. One of ordinary skill in the art will appreciate that this disclosure is not to be limited to this list, or the following discussion, is equally applicable to the broadcast engineering environments of content acquisition and content production, and is applicable for various other formats, medium, platforms, and distribution channels known to those skilled in the art.

Embodiments are directed to processing data in a broadcast engineering environment.

By way of example, a data model is utilized that serves as a catalog for information including broadcasting-related metadata for uncompressed and compressed signals, including video signals, audio signals and ancillary data signals, and the facilities that convey the signals. Utilizing the data model, the information may be organized in a cohesive and/or useful manner. For example, broadcasting-related metadata may be saved and maintained at a single location, and subsequently retrieved by one or more relevant systems from that location.

According to at least one embodiment, requests for information are facilitated using the data model, in which one-to-one associations between objects/artifacts of a processing flow are stored and maintained.

Figure 1:
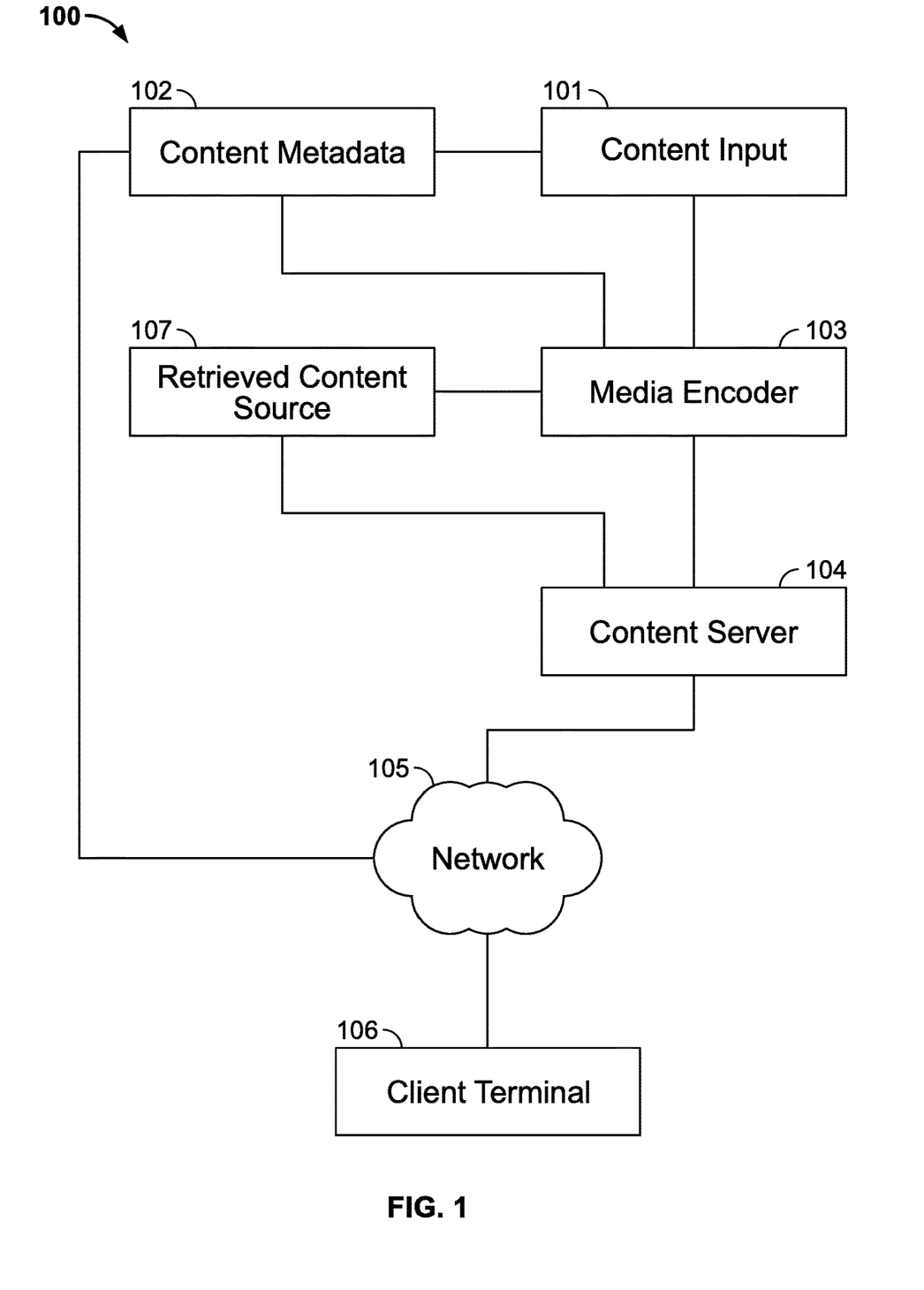
FIG. 1 is an illustration of a system for processing data in a broadcast engineering environment according to at least one embodiment.

Referring to FIG. 1, a system 100 for processing data in a broadcast engineering environment is illustrated. The system 100 may be configured to generate, encode, distribute, and/or store audio and/or video content, as well as receive and handle requests from a client terminal for presentation of the content. FIG. 1 will be discussed with respect to content that is suitable for delivery by broadcast, etc. However, this disclosure is not to be limited thereto, and it will be understood by those of ordinary skill in the art that the features discussed herein are applicable to numerous other applications, platforms, and content delivery methods well known by those of ordinary skill in the art.

The system 100 may include a content input 101 in which content is created and/or generated for encoding and distribution. At the content input 101, a particular piece of content may be captured and/or uploaded. According to other embodiments of the system 100, the content may be otherwise provided from various sources including video (e.g., television broadcast, cable video distribution systems, satellite content distribution, Internet video, streaming video, mobile video distribution systems, digital video downloads, etc.). For purposes of brevity, examples of the content will be described herein mostly with respect to non-advertisement content or advertisement content that is uploaded. However, it is understood that other types of content may be utilized. For example, although embodiments are described herein with reference to video content, it is understood that non-video or text-based content (such as interactive gaming, articles, ebooks, etc.) may be utilized.

The embodiment of the system 100 may further include a content metadata source 102, which creates, gathers, compiles, and/or provides metadata related to the content for compilation and incorporation with the distributed content. For example, the metadata may describe thematic elements, underlying subject matter, and other data.

In the system 100, the content metadata source 102 and the content input 101 may be coupled to a media encoder 103, which is configured to encode the content, along with encoded metadata of the content. The encoded files are then made available for broadcast (e.g., according to a particular schedule).

In some embodiments, the encoded files may correspond to commonly known compressed or uncompressed file formats including MPEG-1, MPEG-2, MPEG-4, H.264, AVC, DV, DVCAM, AVI, ASF, MOV, WMV, etc. However, it is understood that this disclosure is not limited thereto, and that numerous other compressions and formats may be utilized. The encoder may encode content and cause the generated encoded files to be distributed by a content server 104.

The media encoder 103 may also be configured to cause encoded media files to be concurrently stored in a memory associated with the content server 104. In some embodiments the media encoder 103 may also be configured to provide the encoded media files to a retrieved content source 107 where it may be stored for retrieval. In other embodiments, the encoded media files may be stored in a database external to the system, and the content server 104 or the retrieved content source 107 may be configured to store pointers or path descriptions for querying and/or requesting the encoded media files from the external database for later retrieval.

According to at least one embodiment, the encoded media files may be stored in the retrieved content source 107 along with metadata associated with the media files, including encoding metadata, closed captioning information, etc. In some embodiments, the retrieved content source 107 may also receive metadata directly from content metadata source 102, for association and storage with the encoded media files.

Returning to the content server 104 of the system 100, the content server 104 may include a plurality of content servers, each configured to handle requests for media files and to facilitate transmission of media files to requesting parties. As illustrated in FIG. 1, the content server 104 may be in communication with a client terminal 106 via a network 105.

The content server 104 may be configured to receive requests from the client terminal 106 for media content, and provide information to the client terminal 106 in response to the request. The information may include data associated with the encoded media content or address information for retrieving files of the encoded media content. It will be understood that content server 104 may be configured to provide information, data, and media content other than video, including audio, text, metadata, etc.

For example, content server 104 may be an enterprise server, a web server, a media server, a mobile data server, or any other type of server. In some embodiments, the content server 104 may be a computer or a computer program responsible for accepting requests (e.g., HTTP, RTSP, or other protocols that can initiate a media session) from client terminal 106 and serving client terminal 106 with streaming media. Although not shown in FIG. 1, embodiments are considered in which the client terminal 106 is configured to transmit and receive data directly to and from a separate web server, which in turn transmits and receives data transmissions to and from the content server 104 via a network such as the network 105.

In some embodiments, the content server 104 may be configured to provide the client terminal 106 with one or more manifest data files which include information related to the encoded media content. The manifest data file may be provided to the client terminal 106 in response to a request for encoded media content. The manifest may include information on suggested bandwidths for each encoding level, a location where each encoding data file is available such as an address, link, or other pointer to a location where the encoding file can be retrieved, and various metadata related to the encoded media content, such as event information, media type, aspect ratios, codec information, and the like. In some embodiments, the manifest may be provided in the form of an XML file. However, various implementations and file types which are well known to those of ordinary skill in the art are considered.

The network 105 may include various systems for distribution of content including any desired combination of hardwired and wireless communication links, including wide area networks (WAN), local area networks (LAN), wireless networks suitable for packet-type communications, over-the-air, satellite, cable, Internet, other network connection systems, etc., which implement networks and hardware known and used in the related art, including broadcast technologies, cable or satellite distribution systems, Internet protocol (IP), or other networked technologies, etc. Examples of the content include live and recorded television, movies, Internet streaming video and audio, music, radio or other audio-visual content, and the like. The system 100 may also include a gateway (not depicted), for example, a server, a router, a firewall server, a host, a proxy server, request redirector, etc.

The client terminal 106 may be connected to the network 105. The client terminal 106 may be a hardware component including software code and applications that are configured to allow the client terminal to communicate, transmit, request, and receive data packets, which may correspond to streaming media data, via the network 105. The client terminal 106 may include any terminal or system configured to receive a content signal, and, in some embodiments, the client terminal 106 may be configured to decode received encoded media files and prepare the content for presentation to a user via an output device such as a display. The output device may be implemented in the same hardware as the client terminal 106, or, in some embodiments, the output device may be implemented in a separate hardware or location from the client terminal 106 and be otherwise coupled and/or associated with the client terminal, such as by wired connection or wireless communication.

For example, the client terminal 106 may correspond to an Internet video streaming device, which is configured to request, transmit, and receive data packets corresponding to Internet streaming video, and the client terminal may be further configured to decode received data packets and prepare the media content to be displayed via a separate output, such as a television. In some embodiments, the client terminal 106 may also be configured to transmit information to one or more other aspects of the system 100 via the network 105, or similar network, regarding the content data received and decoded by the client terminal 106. Various other embodiments of the client terminal 106 may include televisions, desktop computers, laptop computers, tablet computers, mobile smartphones, personal media devices, wearable devices, set top box receivers, streaming Internet content devices, satellite television receivers, etc. In other embodiments, the client terminal 106 may be implemented in more than one connected device.

In an embodiment, the client terminal 106 may request, retrieve, and/or receive particular content from the content server 104 via the network 105. The request, retrieval, and/or the receiving of the particular content may correspond to a user of a client terminal selecting a particular piece(s) of content, entering a particular URL or address at the client terminal, or utilizing a content provider-specific application that is configured to connect to the content server 104 to transmit and receive instructions or requests for retrieval of specific content items. In some embodiments, the content server 104 may be configured to provide client terminal 106 with a single or multiple encoding streams of information, including audio/video content, as well as data associated with the audio/video content, such as metadata.

With respect to metadata, the client terminal 106 may request information (e.g., identifier) that is more generic (or generalized) than a particular identifier that identifies a discrete broadcast signal.

Some aspects of the present disclosure are directed to a data model (or structure) for responding to such requests either from the client terminal 106 or from other devices at various points along the broadcast system. According to one or more particular aspects, the data model is for use by a broadcast engineering entity—e.g., a broadcast programmer such as NBC, etc., or a cable television provider. The data model may be configured to operate and/or interact with a web-based or Internet application, which may, in turn, be supported by a database.

The data model may support a media library. According to particular aspects, the media library is for storing data related to data streams including live linear streams. Live linear streams provide television programming that has been programmed to start and end at pre-scheduled times. Live linear streaming is typically performed by entities that provide programming for broadcast (or some other form of distribution) 24 hours a day, 7 days a week, according to a particular schedule. For example, a programmer may use live linear streams to distribute content to affiliates, such as local television stations. The content may be distributed over data networks such as IP networks, or over legacy electronic media, such as radio signals or copper cabling (e.g., baseband).

Aspects of the present disclosure are directed toward providing a catalog of such streams and the facilities that provide and/or receive the streams. Although various embodiments will be described with reference to compressed and uncompressed live linear video streams, it is understood that features described herein also apply to other streams including audio-only streams, ancillary data streams, etc.

Figure 2:
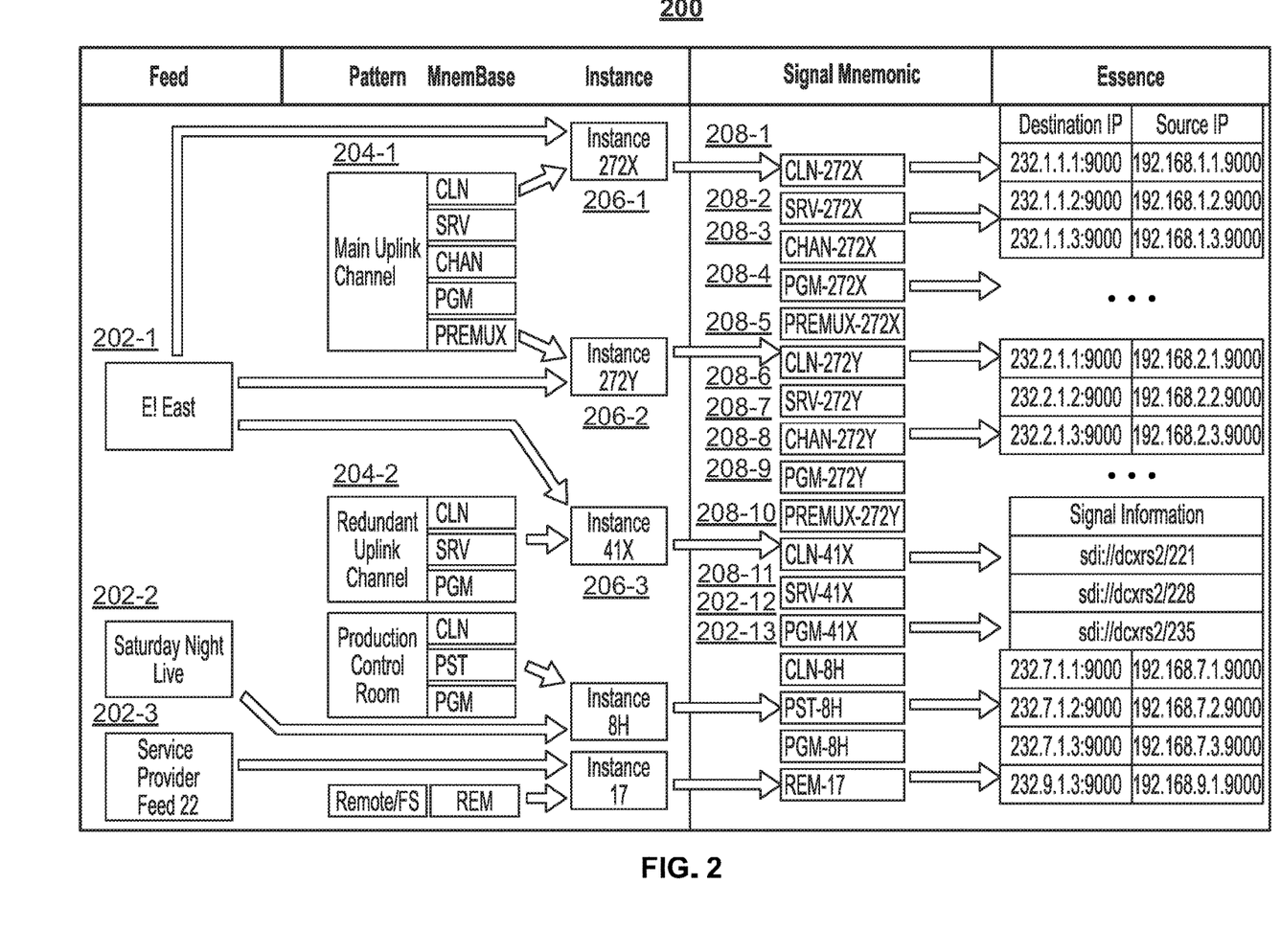
FIG. 2 is a block diagram illustrating a processing flow at a broadcast engineering entity according to at least one embodiment.

FIG. 2 is a block diagram 200 illustrating the hierarchy of signal references within a broadcast engineering entity according to at least one embodiment. Feeds 202-1, 202-2, 202-3 represent consumer-friendly notions of content. For example, feed 202-1 refers to a cable network (e.g., such as E! East) in a particular geographic region or time zone (e.g., Eastern Standard Time), and it is understood that a different channel (e.g., a channel named E! West) would have similar programming but may be for a different region or time zone (e.g., Pacific Standard Time). Other kinds of signal references within a broadcast engineering entity include those in relation to content production like Saturday Night Live or Today Show Hour 3 per 202-2, or those in relation to temporary content acquisition feeds coming from broadcasting and connectivity providers (see, e.g., feed 202-3).

Each feed is associated with one or more instances, where each instance represents a derivative of a feed generated by a processing chain. For example, the feed 202-1 is associated with instance 206-1 ("272X"), instance 206-2 ("272Y"), and instance 206-3 ("41X"). All of those instances are nominally dedicated to conveying the consumer content designated by that particular feed.

Each of the patterns 204-1, 204-2 represents a broadcast system that may be repeated one or more times in a given broadcast facility. The pattern 204-1 may be used to represent a typical system built and operated within a main uplink facility of a broadcast programmer, while the pattern 204-2 may be used to represent a similar system built and operated within a redundant uplink facility of the same programmer. The pattern associates to bases that may be used in the generation of mnemonics for broadcast signals. For example, as illustrated in FIG. 2, five bases are related to the pattern 204-1 ("Main Uplink Channel"). The five bases are named: CLN, SRV, CHAN, PGM and PREMUX, and represent different renditions of the signal as it travels the processing chain. Respectively, these mnemonic bases refer to: "clean" channel content without any keyed graphics, content provided by the automated playout server which includes keyed graphics, a signal referred to as "channel" which is switched between redundant playout systems, a signal referred to as "program" which may be broken-in with contingency content or have other graphics keyed according to operational needs, and a signal as it exists just before being packaged for final distribution. As also illustrated in FIG. 2, three bases are related to the pattern 204-2

("Redundant Uplink Channel"). The three bases are named: CLN, SRV and PGM, similarly defined per above.

Each of the patterns 204-1, 204-2 may be instantiated one or more times to produce one or more instances. Each instance corresponds to a particular build of a broadcast system, in the method prescribed by the pattern, at a site (e.g., a geographic location at which a physical broadcast facility is located, such as New York, London, Toronto, etc.). Each instance is associated with an instance labeling which may a reflect a particular channel number.

For example, as illustrated in FIG. 2, the pattern 204-1 is instantiated twice to produce a first instance 206-1 and a second instance 206-2. The instances 206-1 and 206-2 may be considered as redundant copies of each other. The instance 206-1 is associated with a labeling "272X" which reflects the channel number 272. The instance 206-2 is associated with a labeling "272Y" which also reflects the channel number 272, and serves as an identical, redundant system to instance 206-1.

As also illustrated in FIG. 2, the pattern 204-2 is instantiated once to produce a sole instance 206-3. The instance 206-3 is associated with a labeling "41X" which reflects the channel number 41.

As disclosed earlier, each instance corresponds to a particular build of a broadcast system at a site, at which the broadcast system may be repeated (e.g., within a facility). The instance 206-1 was instantiated from the pattern 204-1, which, as disclosed earlier, has five repetitions: CLN, SRV, CHAN, PGM and PREMUX. Accordingly, the instance 206-1 corresponds to five signals, as would be configured, e.g., on a broadcast router. Each of these signals (signals 208-1, 208-2, 208-3, 208-4 and 208-5) has a corresponding signal mnemonic. The signal mnemonic may be some combination of the label of the corresponding base and the label of the corresponding instance. For example, as illustrated in FIG. 2, the signals 208-1, 208-2, 208-3, 208-4 and 208-5, respectively, have the following signal mnemonics CLN-272X, SRV-272X, CHAN-272X, PGM-272X and PREMUX-272X.

Similarly, the instance 206-2 was also instantiated from the pattern 204-1, which, as disclosed earlier, has five repetitions: CLN, SRV, CHAN, PGM and PREMUX. Accordingly, the instance 206-2 also corresponds to five signals as would be configured, e.g., on a broadcast router. As illustrated in FIG. 2, the signals 208-6, 208-7, 208-8, 208-9 and 208-10, respectively, have the following signal mnemonics CLN-272Y, SRV-272Y, CHAN-272Y, PGM-272Y and PREMUX-272Y.

Similarly, the instance 206-3 was instantiated from the pattern 204-2, which, as disclosed earlier, has three repetitions: CLN, SRV and PGM. Accordingly, the instance 206-3 corresponds to three signals as would be configured, e.g., on a broadcast router. As illustrated in FIG. 2, the signals 208-11, 208-12 and 208-13, respectively, have the following signal mnemonics CLN-272Y, SRV-272Y, CHAN-272Y, PGM-272Y and PREMUX-272Y.

As also illustrated in FIG. 2, each of the signals (e.g., signals 208-1, 208-2, 208-3, etc.) corresponds to an essence, which is a media signal that is specified at a level that is usefully (or meaningfully) discrete. The signals may be conveyed via electronic cabling, carried over radio signals, or as flows on a packet-based data network. Examples of an essence include, without limitation: a serial digital interface (SDI) signal; a Society of Motion Picture & Television Engineers (SMPTE) ST 2110-20/30/40 stream of a given program; an MPEG-4 transport stream; and/or each packet identifier (PID) of an MPEG-4 transport stream.

Individual essences exist on a domain (e.g., video router or IP subnetwork). If two or more essences are assigned to a single domain using the same parameters (e.g., multicast destination address, router input number, etc.), then the two or more essences may collide with one another on the domain. Otherwise, two or more essences may exist on that domain, without affecting each other. For example, it may be preferred that no essence should annihilate any other essence existing within the same domain.

According to one or more embodiments, the concept of an essence relates to a separate entity that exists in a particular domain and is able to be transmitted without colliding with other entities in the domain.

As disclosed earlier, the labeling of the instances 206-1 and 206-2 reflects a particular channel number (272). Also, the labeling of the instance 206-3 reflects a different particular channel number (41). Such channel numbers (e.g., 272, 41) may carry significance for engineers or personnel who are sufficiently acquainted or familiar with the processing flow of FIG. 2. For example, such individuals may be able to readily recognize that the channel numbers 272 and 41 correspond to/originate from the feed 202-1 ("E! East"). However, other individuals may not be able to readily reach such a conclusion. For example, the channel numbers 272 and 41 may carry little to no significance for a relative newcomer.

As another example, certain individuals (e.g., broadcast engineers) may be able to readily recognize the signal mnemonics (e.g., CLN-272X, SRV-272X, CHAN-272X, PGM-272X and PREMUX-272X of the signals 208-1, 208-2, 208-3, 208-4 and 208-5, respectively) as corresponding to/originating from the feed 202-1 ("E! East"). However, such signal mnemonics may carry little to no significance for a relative newcomer.

Aspects of this disclosure are directed to a data model that facilitates creation of associations between what might be deemed human-friendly names (e.g., names of feeds such as "E! East") and what might be deemed engineering-friendly names (e.g., channel numbers such as 272 and 41). According to various embodiments—with reference to FIG. 2, associations may be created between one or more entities/artifacts of a flow that are illustrated at (or around) the left-hand side of FIG. 2 (e.g., "E! East," "Main Uplink Channel," etc.) and one or more entities/artifacts of the flow that are illustrated at (or around) the right-hand side of FIG. 2 (e.g., "instance 272X," "CLN-272X," etc.). As such, associations are created between incoming entities/artifacts (e.g., feeds that are being provided to a broadcast facility) and outgoing entities/artifacts (e.g., feed patterns that are being output by the broadcast facility). The entities/artifacts may be coming in from/going to different geographical locations.

According to aspects of this disclosure, a data model serves to relate entities/artifacts of a particular flow from labels that are more human-friendly to those that are more engineering-friendly. For example, according to various embodiments, associations between entities at the signal-mnemonic level and entities at other levels (e.g., the feed level, the pattern level) are created, and the created associations are stored. The stored associations facilitate a system that receives input queries and provides responses to such queries. For example—if such a system receives an input query "What feed is on Channel 272?" the system uses an association (e.g., a one-to-one association) between an instance (e.g., instance 206-1) (or a signal such as signal

208-1, 208-2, etc.) and a feed (e.g., feed 202-1). Based on this association, the system is able to respond to the query with the answer "E! East."

According to further embodiments, associations between feeds and other parameters or characteristics may also be created and stored. These other parameters may include: the name of a site (e.g., a physical broadcast facility location receiving the feed and outputting a signal, such as New York Network Operations Center or Los Angeles Satellite Earth Station); the name of a particular piece of equipment (e.g., a device that transmits the signal, such as a gateway card or an encoder); the name of a particular connection (e.g., the means by which the device transmits a signal, such as a particular port or a particular jack); and/or the name of a particular format (e.g., the particular definition of a signal represented by an essence, such as HD-SDI, 15 Mbps, TS, ST-2110-40).

Examples of essences have been described with reference to an IP subnetwork. However, it is understood that essences may also exist on a domain governed by the broadcast protocol referred to as SDI. Here, an essence refers not to an IP stream, but rather a unique entity in a broadcast device called an SDI video router.

According to aspects of this disclosure, a data model creates and stores associations for two (or more) redundant systems. For example, the data model can associate a particular feed with both a first of two redundant systems (referred to, e.g., as "the X side") and also a second of the two redundant systems (e.g., referred to, e.g., as "the Y side").

Features of various embodiments have been described with reference to a distribution environment, which involves satellite uplink affiliates, distributors, etc. It is understood that that features described may also apply to other environments, including a production environment. The production environment may involve flows of signals between various devices/facilities including cameras, control rooms, studios, microphones, etc.

In such an environment, a data model according to one or more embodiments may facilitate creation of associations between more-human-friendly names and more-engineering-friendly names. For example, the instances 206-1, 206-2, etc. of a distribution environment may be considered as being analogous to production control rooms in a production environment. More engineering-friendly labels or names used in the production environment may include CLN, PST, and PGM—defined respectively as the "clean" content without any keyed graphics or embedded video metadata, the "preset" content that is about to be put on-air by operations staff, and the "program" content which is considered the most main content of interest produced by the particular control room facility. Other entities in a production include: a position (e.g., a role designation for broadcast productions such as TD, D, AD, P1, FRO and TM); an assignment (e.g., an instantiation of a position for an instance (control room)) such as a particular role (e.g., a technical director, director, assistant director, producer, a graphics front row operator, a technical manager, etc.); and/or a person (e.g., a contact who carries certain responsibilities in the control room and/or in the production environment). The assignment may correspond to a position identified on the keys (or buttons) of a communications panel. One or more persons may be associated with a particular assignment.

The stored associations facilitate a system that receives input queries and provides replies in response to such queries. For example—if such a system receives an input query "What control room is John Doe in? What phone extension?" the system uses an association (e.g., a one-to-one association) between an instance (e.g., control room) and a person (e.g., a person by the name of John Doe) to answer the query by providing a reply.

Features described may also apply to a contribution environment. The contribution may involve remote feeds that are provided into a facility. An example of a remote feed may be a satellite feed featuring content (e.g., live content) generated at a remote location (e.g., a reporter giving a report from Saudi Arabia, live footage from the White House, etc.). For example, according to various embodiments, associations between entities at the signal-mnemonic level and entities at other levels (e.g., the feed level) may be created and stored.

As described earlier, a data model may be used to facilitate retrieval of information in response to a request for information. The data model may be configured to operate and/or interact with a web-based or Internet application. Such interactions may include voice interactions that are analyzed using natural language processing.

According to at least one embodiment, data regarding objects/artifacts in a broadcast environment (e.g., a distribution environment) is stored in a centralized and consistently conceptualized data model. As such, the need for multiple, duplicated copies to be maintained by different groups is eliminated (or at least reduced). This approach ensures that the same feeds and facilities are correctly referred to wherever appropriate, and allows more sophisticated conclusions to be drawn from the fully interrelated body of data.

Figure 3A:
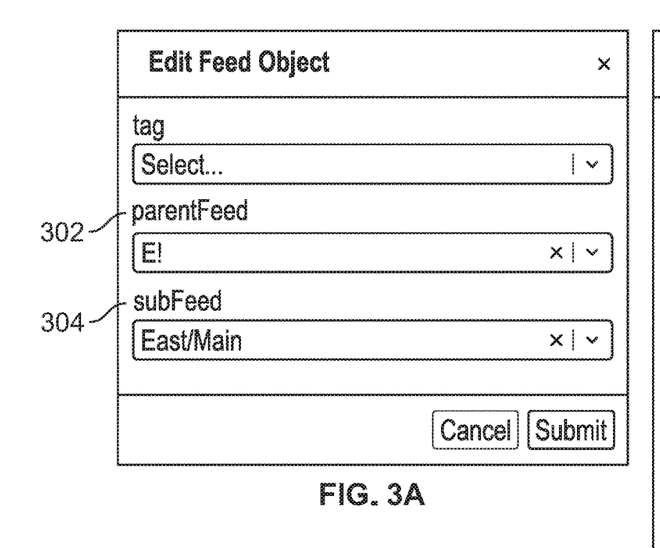
FIGS. 3(a), 3(b), 3(c), 3(d) and 3(e) illustrate examples of user interfaces for creating and associating entities representing a live linear video signal according to at least one embodiment.

FIGS. 3(a), 3(b), 3(c), 3(d) and 3(e) illustrate examples of user interfaces for creating and associating entities representing a live linear video signal according to at least one embodiment. With reference to FIG. 3(a), a user creates a Feed object. The Feed object may be similar to the feeds 202-1, 202-2, 202-3 described earlier with reference to FIG. 2. By way of example, FIG. 3(a) illustrates creation of a Feed object corresponding to the feed 202-1 of FIG. 2. The created Feed object has a parentFeed 302 value ("E!") and a subFeed 304 value ("East/Main") that represent the cable channel E! East.

Figure 3B:
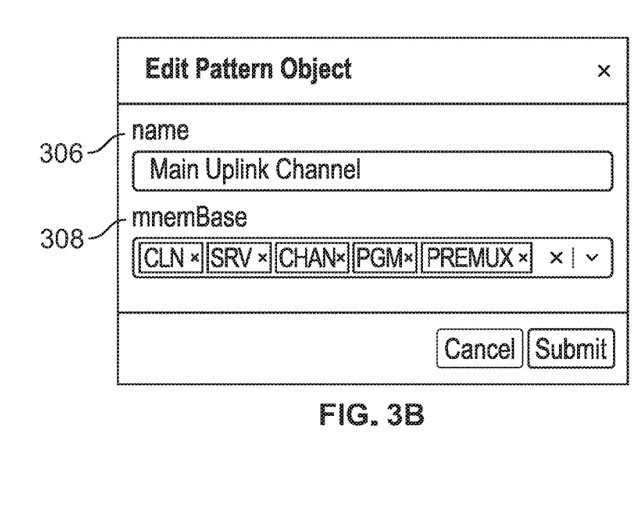

With reference to FIG. 3(b), a Pattern object is created for the Feed object of FIG. 3(a). The Pattern object may be similar to the patterns 204-1, 204-2 described earlier with reference to FIG. 2. By way of example, FIG. 3(b) illustrates creation of a Pattern object corresponding to the pattern 204-1 of FIG. 2. The created Pattern object has a Name 306 value ("Main Uplink Channel") and one or more related bases 308 (e.g., CLN, SVR, CHAN, PGM, PREMUX). As such, the created Pattern object corresponds to the pattern 204-1 of FIG. 2.

Figure 3C:
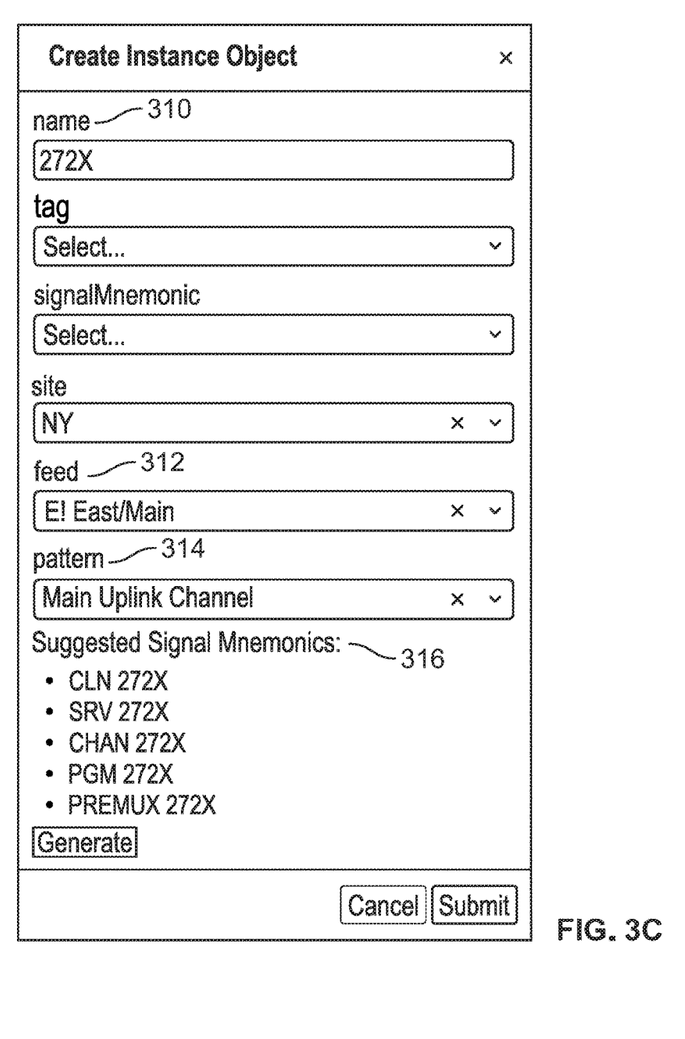
Figure 3D:
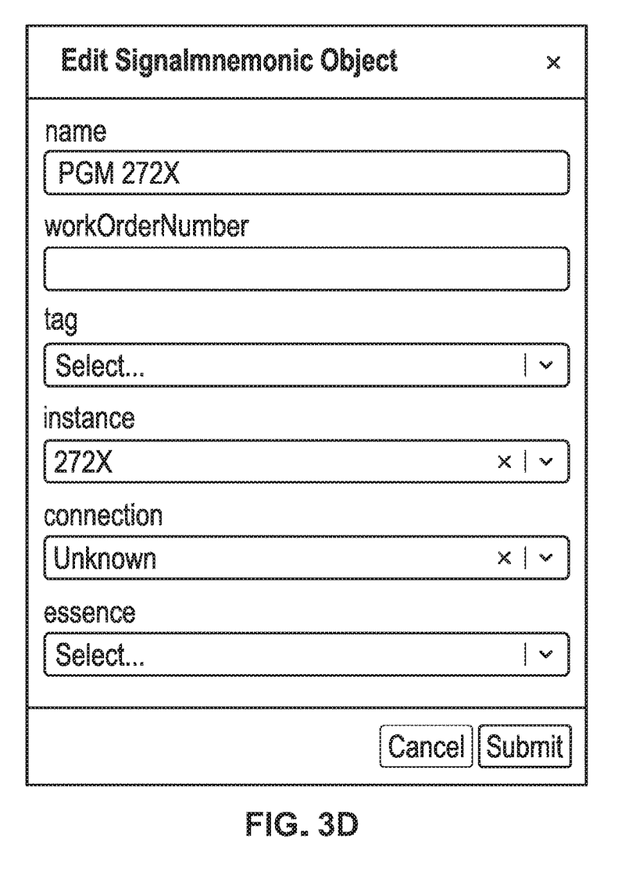
Figure 3E:
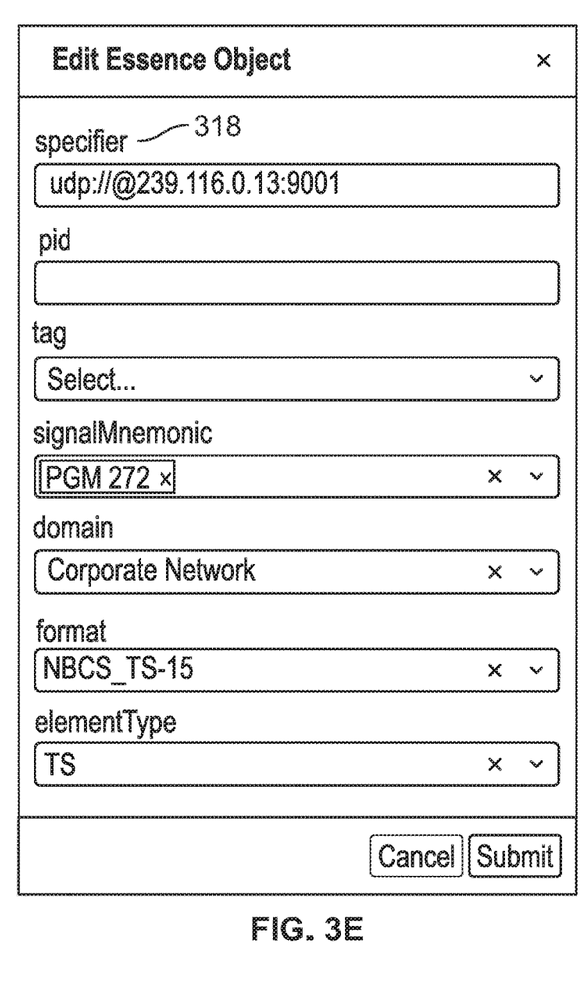

With reference to FIG. 3(c), an Instance object is created for the Feed object and the Pattern object of FIGS. 3(a) and 3(b), respectively. The Instance object may correspond to a system within a facility that typically processes the signal carrying the feed. The Instance object may be similar to the instances 206-1, 206-2, 206-3 of FIG. 2. By way of example, FIG. 3(c) illustrates creation of an Instance object corresponding to the instance 206-1. The created Instance object has a Name 310 value ("272X"). In addition, the created Instance object has a feed 312 value ("E! East/Main") that matches the parentFeed 302 and subFeed 304 values illustrated in FIG. 3(a). As such, the Instance object is associated with the Feed object of FIG. 3(a). In addition, the created Instance object has a pattern 314 value ("Main Uplink Channel") that matches the Name 306 value illustrated in FIG. 3(*b*). As such, the Instance object is associated with the Pattern object of FIG. 3(*b*).

Based on the values described with reference to FIG. 3(*c*), one or more suggested signal mnemonics 316 may be autonomously generated for review by the user. The suggested signal mnemonics 316 may be generated based on the bases 308 that were previously selected (see FIG. 3(*b*)). As illustrated in FIG. 3(*c*), the suggested signal mnemonics 316 may include: CLN 272X, SRV 272X, CHAN 272X, PGM 272X and PREMUX 272X.

With reference to FIGS. 3(*d*) and 3(*e*), information regarding a related Signal Mnemonic object and a related Essence object may be defined. For example, with reference to FIG. 3(*e*), an Essence object is created. The Essence object has a specifier 318 value that corresponds to a particular IP data network. The Essence object is associated with a particular signal mnemonic ("PGM 272X), as well as all already-associated upstream objects.

It is understood that the information described with reference to FIGS. 3(*a*), 3(*b*), 3(*c*), 3(*d*) and 3(*e*) may be stored in a table (e.g., a look-up table). The table may be for identifying associations between a particular entity (e.g., the signal mnemonic PGM 272X) and a particular upstream entity (e.g., the pattern Main Uplink Channel of the feed E! East/Main).

Further, it is understood that the creation described with reference to FIGS. 3(*a*), 3(*b*), 3(*c*), 3(*d*) and/or 3(*e*) may be performed for any other signals associated with the same channel content, for any other facility that also processes the same content, for any other content processed within the same facility in a similar way, etc., by using references to these created data objects.

Also, it is understood that the creation may be programmatically executed by automated systems when at least one embodiment is implemented with an Application Programmers Interface (API) that allows for the creation, modification, association, and deletion of its objects.

Figure 4:
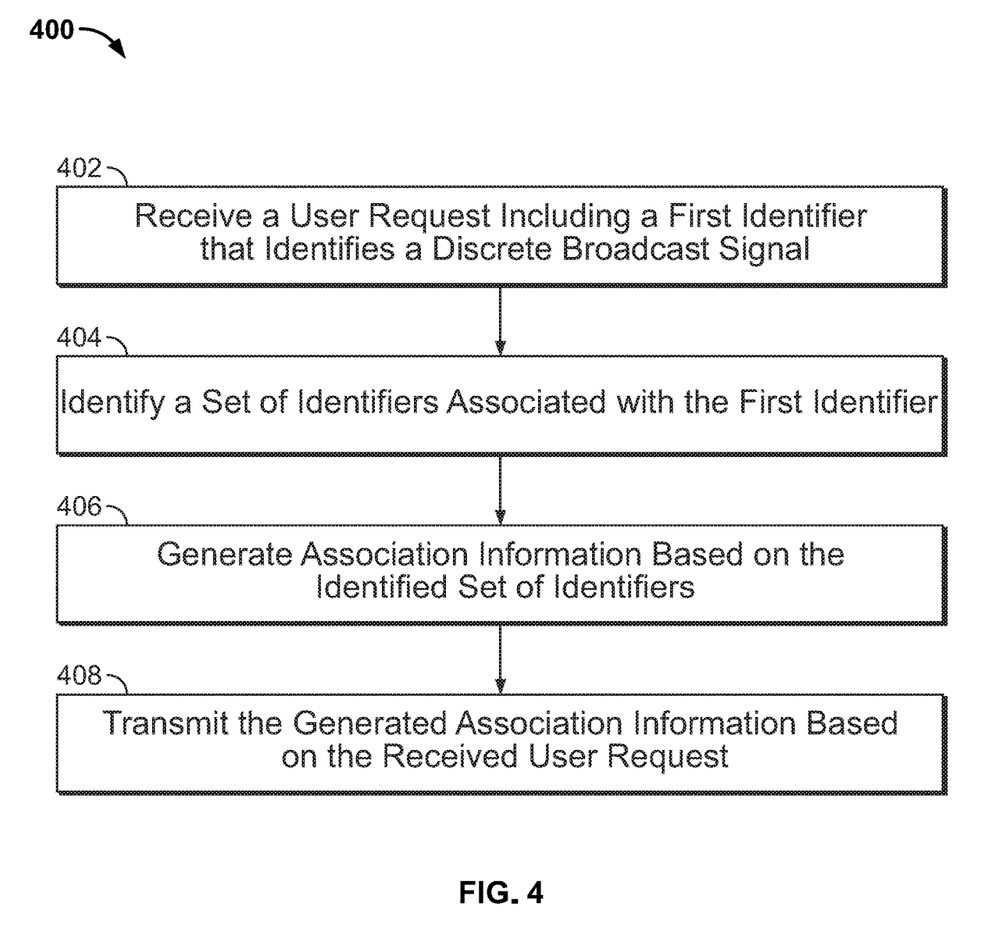
FIG. 4 is a flowchart illustrating a method of processing data in a broadcast engineering environment according to at least one embodiment.

FIG. 4 illustrates a flowchart of a method 400 of processing data in a broadcast engineering environment according to at least one embodiment.

With reference to box 402, a user request is received. The user request includes a first identifier that identifies a discrete broadcast signal. For example, the first identifier may include a channel number associated with the discrete broadcast signal (e.g., channel number 272, as described earlier with reference to FIG. 2).

The user request may be received via a web-based or Internet application. For example, the user request may be received using natural language processing via the web-based or Internet application.

According to at least one particular embodiment, the first identifier includes a name of a physical broadcast facility outputting the discrete broadcast signal, a name of a device outputting the discrete broadcast signal, a name of a port or an output jack of the device outputting the discrete broadcast signal, or a name of a particular format of the discrete broadcast signal. The device outputting the discrete broadcast signal may include a gateway card or an encoder.

With reference to box 404, a set of identifiers associated with the first identifier is identified. The set of identifiers include at least one of Connection, Domain, Domain Type, Equipment, Essence, Feed, Format, Instance, Mnemonic Base, Pattern, Signal Mnemonic, or Site. For example, the set of identifiers may include a Feed identifier such as "E! East" (e.g., as illustrated in FIG. 2 and/or as described with reference to FIGS. 3(*a*), 3(*b*), 3(*c*), 3(*d*) and 3(*e*)).

With reference to box 406, association information is generated based on the identified set of identifiers.

For example, the generated association information may include information regarding a feed signal (e.g., "E! East") corresponding to the channel number (e.g., 272) associated with the discrete broadcast signal. As a further example, the generated association information may identify a one-to-one association between the channel number (e.g., 272) associated with the discrete broadcast signal and the feed signal (e.g., "E! East) corresponding to the channel number associated with the discrete broadcast signal.

The generated association information may include a table including the first identifier and the set of identifiers and indicating an association between the first identifier and the set of identifiers.

With reference to box 408, the generated association information is transmitted based on the received user request.

As previously described, in at least some embodiments, the client terminal, the encoder, the content server, the web servers, or other aspects of the described system (e.g., system 100 of FIG. 1) may include one or more software or hardware computer systems and may further include (or may be operably coupled to) one or more hardware memory systems for storing information including databases for storing, accessing, and querying various content, encoded data, shared addresses, metadata, etc. In hardware implementations, the one or more computer systems incorporate one or more computer processors and controllers.

The components of various embodiments described herein may each include a hardware processor of the one or more computer systems, and, in one embodiment, a single processor may be configured to implement the various components. For example, in one embodiment, the encoder, the content server, and the web server, or combinations thereof, may be implemented as separate hardware systems, or may be implemented as a single hardware system. The hardware system may include various transitory and non-transitory memory for storing information, wired and wireless communication receivers and transmitters, displays, and input and output interfaces and devices. The various computer systems, memory, and components of the system may be operably coupled to communicate information, and the system may further include various hardware and software communication modules, interfaces, and circuitry to enable wired or wireless communication of information.

Figure 5:
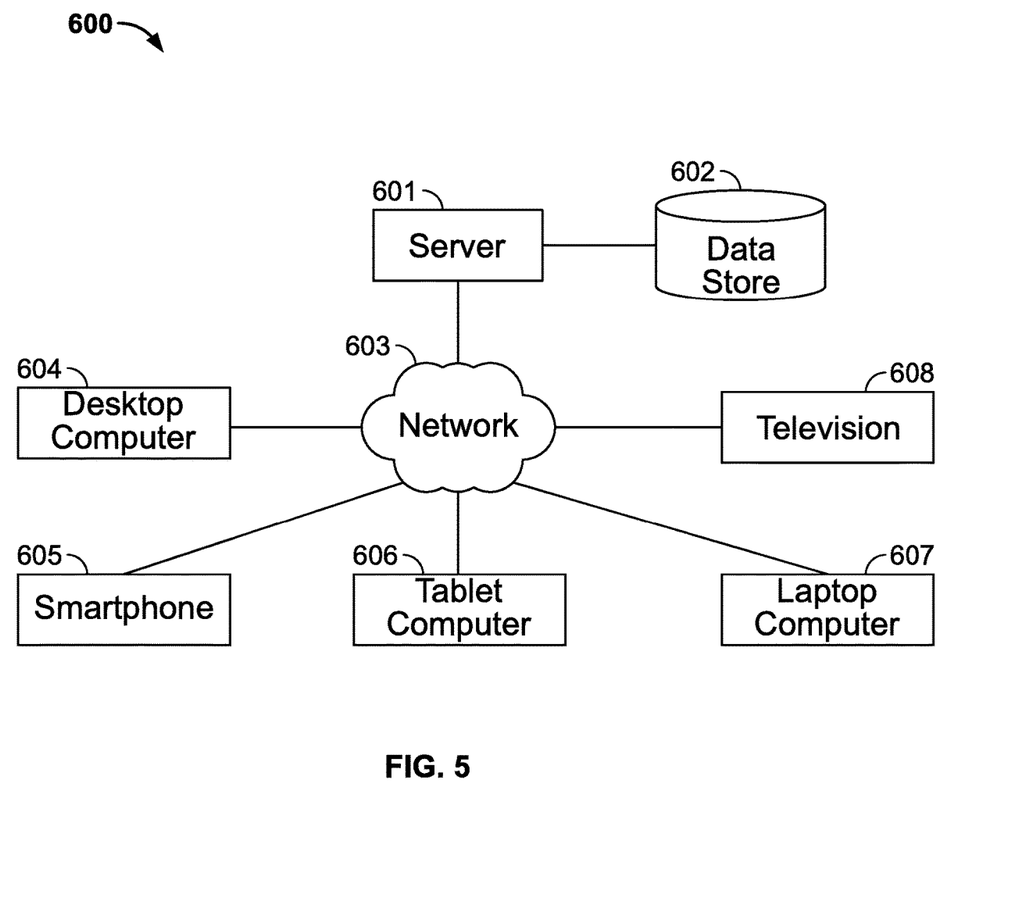
FIG. 5 is an illustration of a computing environment according to at least one embodiment.

In selected embodiments, features and aspects described herein may be implemented within a computing environment 600, as shown in FIG. 5, which may include one or more computer servers 601. The server 601 may be operatively coupled to one or more data stores 602 (e.g., databases, indexes, files, or other data structures). The server 601 may connect to a data communication network 603 including a local area network (LAN), a wide area network (WAN) (e.g., the Internet), a telephone network, a satellite or wireless communication network, or some combination of these or similar networks.

One or more client devices 604, 605, 606, 607, 608 may be in communication with the server 601, and a corresponding data store 602 via the data communication network 603. Such client devices 604, 605, 606, 607, 608 may include, for example, one or more laptop computers 607, desktop computers 604, smartphones and mobile phones 605, tablet computers 606, televisions 608, or combinations thereof. In operation, such client devices 604, 605, 606, 607, 608 may send and receive data or instructions to or from the server 601 in response to user input received from user input devices or other input. In response, the server 601 may serve data from the data store 602, alter data within the data store 602, add data to the data store 602, or the like, or combinations thereof.

In selected embodiments, the server 601 may transmit one or more media files including audio and/or video content, encoded data, generated data, and/or metadata from the data store 602 to one or more of the client devices 604, 605, 606, 607, 608 via the data communication network 603. The devices may output the audio and/or video content from the media file using a display screen, projector, or other display output device. In certain embodiments, the system 600 configured in accordance with features and aspects described herein may be configured to operate within or support a cloud computing environment. For example, a portion of, or all of, the data store 602 and server 601 may reside in a cloud server.

Figure 6:
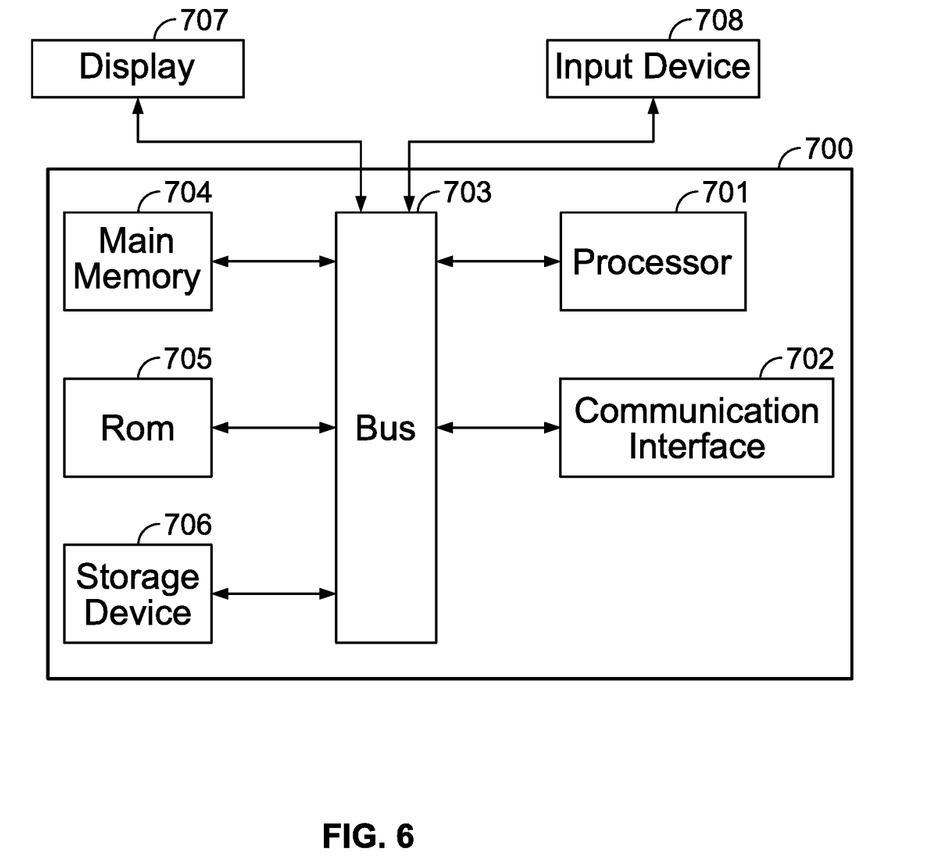
FIG. 6 is a block diagram of a device according to at least one embodiment.

With reference to FIG. 6, an illustration of an example computer 700 is provided. One or more of the devices 604, 605, 606, 607, 608 of the system 600 may be configured as or include such a computer 700. In addition, one or more components of the system 100 of FIG. 1 may be configured as or include the computer 700.

In selected embodiments, the computer 700 may include a bus 703 (or multiple buses) or other communication mechanism, a processor 701, main memory 704, read only memory (ROM) 705, one or more additional storage devices 706, and/or a communication interface 702, or the like or sub-combinations thereof. Embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In all embodiments, the various components described herein may be implemented as a single component, or alternatively may be implemented in various separate components.

The bus 703 or other communication mechanism, including multiple such buses or mechanisms, may support communication of information within the computer 700. The processor 701 may be connected to the bus 703 and process information. In selected embodiments, the processor 701 may be a specialized or dedicated microprocessor configured to perform particular tasks in accordance with the features and aspects described herein by executing machine-readable software code defining the particular tasks. Main memory 704 (e.g., random access memory—or RAM—or other dynamic storage device) may be connected to the bus 703 and store information and instructions to be executed by the processor 701. Main memory 704 may also store temporary variables or other intermediate information during execution of such instructions.

ROM 705 or some other static storage device may be connected to a bus 703 and store static information and instructions for the processor 701. The additional storage device 706 (e.g., a magnetic disk, optical disk, memory card, or the like) may be connected to the bus 703. The main memory 704, ROM 705, and the additional storage device 706 may include a non-transitory computer-readable medium holding information, instructions, or some combination thereof—for example, instructions that, when executed by the processor 701, cause the computer 700 to perform one or more operations of a method as described herein. The communication interface 702 may also be connected to the bus 703. A communication interface 702 may provide or support two-way data communication between the computer 700 and one or more external devices (e.g., other devices contained within the computing environment).

In selected embodiments, the computer 700 may be connected (e.g., via the bus 703) to a display 707. The display 707 may use any suitable mechanism to communicate information to a user of a computer 700. For example, the display 707 may include or utilize a liquid crystal display (LCD), light emitting diode (LED) display, projector, or other display device to present information to a user of the computer 700 in a visual display. One or more input devices 708 (e.g., an alphanumeric keyboard, mouse, microphone) may be connected to the bus 703 to communicate information and commands to the computer 700. In selected embodiments, one input device 708 may provide or support control over the positioning of a cursor to allow for selection and execution of various objects, files, programs, and the like provided by the computer 700 and displayed by the display 707.

The computer 700 may be used to transmit, receive, decode, display, etc. one or more video files. In selected embodiments, such transmitting, receiving, decoding, and displaying may be in response to the processor 701 executing one or more sequences of one or more instructions contained in main memory 704. Such instructions may be read into main memory 704 from another non-transitory computer-readable medium (e.g., a storage device).

Execution of sequences of instructions contained in main memory 704 may cause the processor 701 to perform one or more of the procedures or steps described herein. In selected embodiments, one or more processors in a multi-processing arrangement may also be employed to execute sequences of instructions contained in main memory 704. Alternatively, or in addition thereto, firmware may be used in place of, or in connection with, software instructions to implement procedures or steps in accordance with the features and aspects described herein. Thus, embodiments in accordance with features and aspects described herein may not be limited to any specific combination of hardware circuitry and software.

Non-transitory computer readable medium may refer to any medium that participates in holding instructions for execution by the processor 701, or that stores data for processing by a computer, and include all computer-readable media, with the sole exception being a transitory, propagating signal. Such a non-transitory computer readable medium may include, but is not limited to, non-volatile media, volatile media, and temporary storage media (e.g., cache memory). Non-volatile media may include optical or magnetic disks, such as an additional storage device. Volatile media may include dynamic memory, such as main memory. Common forms of non-transitory computer-readable media may include, for example, a hard disk, a floppy disk, magnetic tape, or any other magnetic medium, a CD-ROM, DVD, Blu-ray or other optical medium, RAM, PROM, EPROM, FLASH-EPROM, any other memory card, chip, or cartridge, or any other memory medium from which a computer can read.

In selected embodiments, the communication interface 702 may provide or support external, two-way data communication to or via a network link. For example, the communication interface 702 may be a wireless network interface controller or a cellular radio providing a data communication network connection. Alternatively, the communication interface 702 may include a LAN card providing a data communication connection to a compatible LAN. In any such embodiment, the communication interface 702 may send and receive electrical, electromagnetic, or optical signals conveying information.

A network link may provide data communication through one or more networks to other data devices (e.g., client devices as shown in the computing environment 600). For example, a network link may provide a connection through a local network of a host computer or to data equipment operated by an Internet Service Provider (ISP). An ISP may, in turn, provide data communication services through the Internet. Accordingly, a computer 700 may send and receive commands, data, or combinations thereof, including program code, through one or more networks, a network link, and communication interface 702. Thus, the computer 700 may interface or otherwise communicate with a remote server (e.g., server 601), or some combination thereof.

The various devices, modules, terminals, and the like described herein may be implemented on a computer by execution of software comprising machine instructions read from computer-readable medium, as discussed above. In certain embodiments, several hardware aspects may be implemented using a single computer; in other embodiments, multiple computers, input/output systems and hardware may be used to implement the system.

For a software implementation, certain embodiments described herein may be implemented with separate software modules, such as procedures and functions, each of which performs one or more of the functions and operations described herein. The software codes can be implemented with a software application written in any suitable programming language and may be stored in memory and executed by a controller or processor.

The foregoing described embodiments and features are merely exemplary and are not to be construed as limiting the present invention. The present teachings can be readily applied to other types of apparatuses and processes. The description of such embodiments is intended to be illustrative, and not to limit the scope of the claims. Many alternatives, modifications, and variations will be apparent to those skilled in the art.

What is claimed is:

1. A method of processing data at a broadcast facility, the method comprising:
   receiving, from a user located at the broadcast facility, a request comprising a first identifier that identifies a discrete broadcast signal provided to the broadcast facility for subsequent broadcast by the broadcast facility,
   wherein the first identifier that identifies the discrete broadcast signal comprises a channel number associated with the discrete broadcast signal;
   identifying, at the broadcast facility, a set of identifiers associated with the first identifier, the set of identifiers comprising at least one of Connection, Domain, Domain Type, Equipment, Essence, Feed, Format, Instance, Mnemonic Base, Pattern, Signal Mnemonic, or Site;
   generating, at the broadcast facility, a table of association information based on the identified set of identifiers,
   wherein the generated table of association information comprises information regarding a feed signal corresponding to the channel number associated with the discrete broadcast signal, and
   wherein the information regarding the feed signal specifies a particular network associated with the discrete broadcast signal and at least a particular geographic region or a particular time zone associated with the discrete broadcast signal; and
   transmitting, to the user located at the broadcast facility, the generated table of association information based on the received request.

2. The method of claim 1, wherein the generated table of association information identifies a one-to-one association between the channel number associated with the discrete broadcast signal and the feed signal corresponding to the channel number associated with the discrete broadcast signal.

3. The method of claim 1, wherein the request is received via a web-based or Internet application.

4. The method of claim 3, wherein the request is received using natural language processing via the web-based or Internet application.

5. The method of claim 1, wherein the first identifier that identifies the discrete broadcast signal comprises a name of a physical broadcast facility outputting the discrete broadcast signal, a name of a device outputting the discrete broadcast signal, a name of a port or an output jack of the device outputting the discrete broadcast signal, or a name of a particular format of the discrete broadcast signal.

6. The method of claim 5, wherein the device outputting the discrete broadcast signal comprises a gateway card or an encoder.

7. The method of claim 1, wherein the generated table of association information comprises a table including the first identifier and the set of identifiers and indicating an association between the first identifier and the set of identifiers.

8. An apparatus for processing data at a broadcast facility, the apparatus comprising:
   a network communication unit configured to transmit and receive data; and
   one or more controllers configured to:
   receive, from a user located at the broadcast facility, a request comprising a first identifier that identifies a discrete broadcast signal provided to the broadcast facility for subsequent broadcast by the broadcast facility,
   wherein the first identifier that identifies the discrete broadcast signal comprises a channel number associated with the discrete broadcast signal;
   identify, at the broadcast facility, a set of identifiers associated with the first identifier, the set of identifiers comprising at least one of Connection, Domain, Domain Type, Equipment, Essence, Feed, Format, Instance, Mnemonic Base, Pattern, Signal Mnemonic, or Site;
   generate, at the broadcast facility, a table of association information based on the identified set of identifiers,
   wherein the generated table of association information comprises information regarding a feed signal corresponding to the channel number associated with the discrete broadcast signal, and
   wherein the information regarding the feed signal specifies a particular network associated with the discrete broadcast signal and at least a particular geographic region or a particular time zone associated with the discrete broadcast signal; and
   transmit, to the user located at the broadcast facility, the generated table of association information based on the received request.

9. The apparatus of claim 8, wherein the generated table of association information identifies a one-to-one association between the channel number associated with the discrete broadcast signal and the feed signal corresponding to the channel number associated with the discrete broadcast signal.

10. The apparatus of claim 8, wherein the request is received via a web-based or Internet application.

11. The apparatus of claim 10, wherein the request is received using natural language processing via the web-based or Internet application.

12. The apparatus of claim 8, wherein the first identifier that identifies the discrete broadcast signal comprises a name of a physical broadcast facility outputting the discrete broadcast signal, a name of a device outputting the discrete broadcast signal, a name of a port or an output jack of the device outputting the discrete broadcast signal, or a name of a particular format of the discrete broadcast signal.

13. The apparatus of claim 12, wherein the device outputting the discrete broadcast signal comprises a gateway card or an encoder.

14. The apparatus of claim 8, wherein the generated table of association information comprises a table including the first identifier and the set of identifiers and indicating an association between the first identifier and the set of identifiers.

15. A machine-readable non-transitory medium having stored thereon machine-executable instructions for processing data at a broadcast facility, the instructions comprising:
receiving, from a user located at the broadcast facility, a request comprising a first identifier that identifies a discrete broadcast signal provided to the broadcast facility for subsequent broadcast by the broadcast facility,
wherein the first identifier that identifies the discrete broadcast signal comprises a channel number associated with the discrete broadcast signal;
identifying, at the broadcast facility, a set of identifiers associated with the first identifier, the set of identifiers comprising at least one of Connection, Domain, Domain Type, Equipment, Essence, Feed, Format, Instance, Mnemonic Base, Pattern, Signal Mnemonic, or Site;
generating, at the broadcast facility, a table of association information based on the identified set of identifiers,
wherein the generated table of association information comprises information regarding a feed signal corresponding to the channel number associated with the discrete broadcast signal, and
wherein the information regarding the feed signal specifies a particular network associated with the discrete broadcast signal and at least a particular geographic region or a particular time zone associated with the discrete broadcast signal; and
transmitting, to the user located at the broadcast facility, the generated table of association information based on the received request.

16. The method of claim 1,
wherein identifying the set of identifiers associated with the first identifier comprises identifying a Connection, a Domain, an Equipment, a Feed, a Format, and an Instance that are associated with the first identifier.

17. The method of claim 1, wherein identifying the set of identifiers associated with the first identifier comprises identifying a Domain Type, an Essence, a Mnemonic Base, and a Pattern that are associated with the first identifier.

* * * * *